United States Patent

Steer

[11] 4,043,216
[45] Aug. 23, 1977

[54] COMPOUND PINIONS FOR USE IN EPICYCLIC GEAR BOXES

[75] Inventor: Ronald John Steer, Pudsey, England

[73] Assignee: Lucas Industries Limited, Great Britain

[21] Appl. No.: 620,928

[22] Filed: Oct. 9, 1975

[30] Foreign Application Priority Data

Oct. 11, 1974 United Kingdom ............... 44214/74

[51] Int. Cl.² ............................................. F16H 35/10
[52] U.S. Cl. ........................................ 74/410; 74/801
[58] Field of Search ............... 74/410, 409, 411, 801, 74/750 R

[56] References Cited

U.S. PATENT DOCUMENTS

| 1,536,092 | 5/1925 | Guy et al. ............................. 74/410 |
| 1,998,891 | 4/1935 | Benson ............................. 74/801 X |
| 2,095,794 | 10/1937 | Corbin ................................. 74/801 |
| 2,844,052 | 7/1958 | Stoeckicht ........................... 74/801 |
| 3,144,790 | 8/1964 | Davis, Jr. et al. .................... 74/801 |
| 3,258,995 | 7/1966 | Bennett et al. ....................... 74/801 |
| 3,274,980 | 9/1966 | Abermeth ........................... 74/801 X |

*Primary Examiner*—James F. Coan
*Attorney, Agent, or Firm*—Kane, Dalsimer, Kane, Sullivan and Kurucz

[57] ABSTRACT

A compound pinion for an epicyclic gearbox has a tubular shaft, two pinion portions freely rotatable on this shaft and a torsion bar interconnecting the pinion portions. In the gearbox the torsion bars of the several pinions can "wind up" to ensure that the load is evenly shared by the pinions.

7 Claims, 1 Drawing Figure

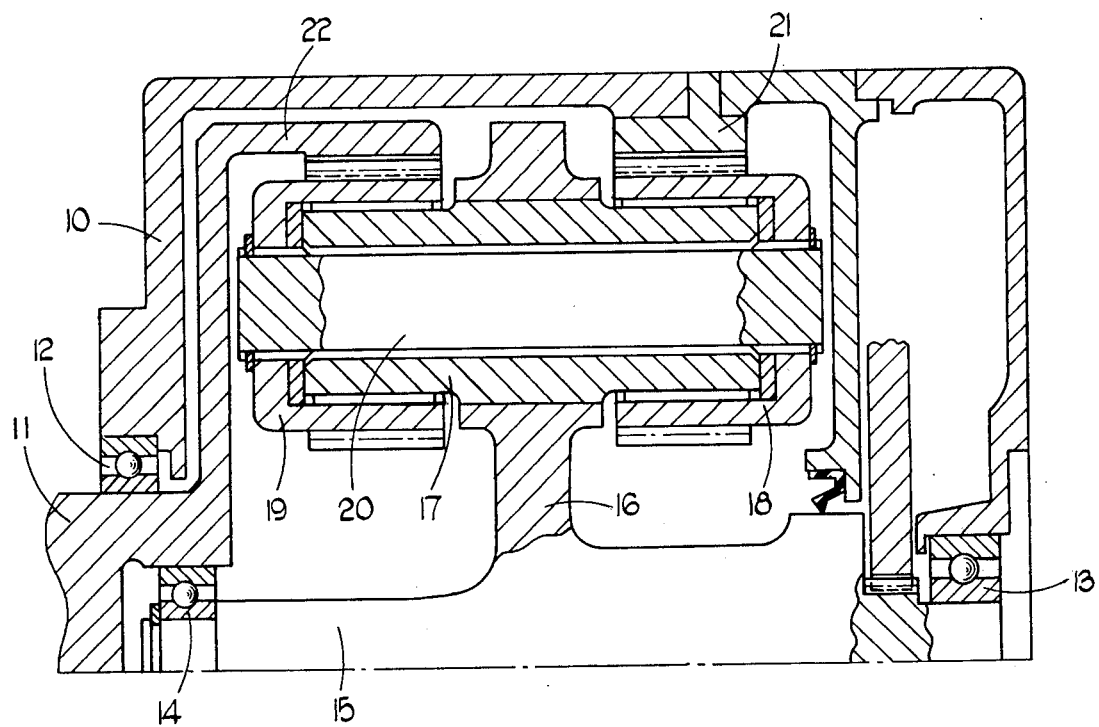

COMPOUND PINIONS FOR USE IN EPICYCLIC GEAR BOXES

This invention relates to compound pinions for use in epicyclic gearboxes and to gearboxes incorporating such pinions.

An epicyclic gearbox usually employs a planet pinion carrier which is rotatable and carries one or more planet pinions which mesh with the sun gears and/or internal ring gears of the gearbox. Where several planet pinions are mounted on the planet pinion carrier it is difficult to ensure that the load is shared equally between the pinions so that even though several pinions are used each has to have a rating only slightly less than would be required if only one pinion were used. If proper load sharing could be accomplished without a bulky mechanism the gearbox could be made very compact. The only solutions to the load sharing problem suggested to date involve bulky mechanisms so that the full advantage of using several pinions has not been realised.

In accordance with the present invention there is provided a compound pinion for use in an epicyclic gearbox, said pinion comprising a tubular shaft portion, a pair of pinion portions mounted on opposite ends of said shaft portion for free rotation relative thereto, and a resilient torsionally flexible member extending through said shaft portion and connected at its ends to the two pinion portions.

Preferably, the torsional stiffness of the torsional flexible member is such that when the full rated torque of the pinion is applied thereto, the torsionally flexible member deflects to a degree such that the lineal displacement of a tooth of each pinion is an order of magnitude greater than the tolerances applied during the manufacture of the pinion.

With such an arrangement, at full load each pinion in a multipinion gearbox will bear between 90% and 110% of its proper share of the load at all times.

An example of the invention is shown in the accompanying drawing which is a fragmentary section through a gearbox including an example of a pinion in accordance with the invention.

The gearbox includes a housing 10 having an output shaft 11 mounted thereon by means of a bearing 12. A further bearing 13 on the housing and a bearing 14 in the output shaft support an input shaft 15, on which there is integrally formed a planet pinion carrier 16. The carrier 16 is fitted with a plurality of tubular shaft portions 17 the axes of which are parallel to and equally spaced about the axis of the shaft 15. A pair of pinion portions 18, 19 are freely rotatably mounted on needle roller bearings on opposite ends of each shaft portion 17. These pinion portions 18, 19 are interconnected by a torsionally flexible member 20 extending through the shaft portion 17. The member 20 is splined at each end and the splined portions thereof are received in splined sockets in the pinion portions 18, 19.

The pinion portion 18 meshes an internal ring gear 21 secured in the housing 10 and the pinion portion 19 meshes an internal ring gear 22 on the output shaft. The numbers of teeth on the ring gears 21, 22 and on the pinion portions 18, 19 are chosen to give a speed reduction between the input shaft 15 and the output shaft 11.

When the gearbox is in operation and there is a load on the output shaft, this load will be substantially equally shared between the several compound planet pinions each constituted by the pinion portions 18, 19 and the member 20. The torque applied to each pinion tends to twist the member 20 so that the teeth of its pinion portions are resiliently loaded against the teeth of the ring gears. The stiffness of the member 20 is such that the lineal deflection of a tooth of the pinion portion 19 relative to the pinion portion 18 at full load is an order of magnitude greater (i.e. at least ten times greater) than the tolerances applied during the manufacture of the pinion portions and the ring gears. With such an arrangement the load on any given pinion will always be within 10% of its proper share of the load on the gearbox (at full gearbox load).

A gearbox as described can be made very compact and can be used when a large speed reduction and a high torque output in a single stage is required.

I claim:

1. A compound pinion for use in an epicyclic gearbox, said pinion comprising a tubular shaft portion, a pair of pinion portions mounted on opposite ends of said shaft portion for free rotation relative thereto, the mounting of the pinion portions on the tubular shaft portion being relatively stiff and a resilient torsionally flexible member extending through said shaft portion and connected at its ends to the two pinion portions, the flexible member adapted to deflect and twist to ensure that the load is substantially evenly shared within prescribed tolerances by the pinion portions, and, thus, the pinion portions only having freedom to move portionally relative to one another.

2. A compound pinion as claimed in claim 1 in which the pinion portions are carried by roller bearings on the tubular shaft portion.

3. A compound pinion as claimed in claim 1 in which the torsional stiffness of the torsional flexible member is such that when the full rated torque of the pinion is applied thereto, the torsionally flexible member deflects to a degree such that the lineal displacement of a tooth of each pinion is an order of magnitude greater than the tolerances applied during the manufacture of the pinion.

4. An epicyclic gear box comprising a housing, a planet pinion carrier mounted in the housing, a plurality of tubular shaft portions mounted on said carrier, a plurality of pairs of planet pinion portions mounted on opposite ends of said respective shaft portions for free rotation thereon, a plurality of resilient torsionally flexible members extending through respective shaft portions, each flexible member being connected at its ends to the two pinion portions on the associated shaft portion and gear means engaging the pinion portions each flexible member adapted to deflect and twist to ensure that the load is substantially evenly shared within prescribed tolerances by the associated pinion portions, and, thus, the said associated pinion portions only having freedom to move portionally relative to one another.

5. An epicyclic gearbox as claimed in claim 4 in which said gear means comprises an output gear rotatable relative to the housing and engaging one pinion portion of each pair of pinion portions and a fixed gear which is fast with the housing engaging the other pinion portion of each pair.

6. An epicyclic gearbox as claimed in claim 5 in which the output gear is an internal gear.

7. An epicyclic gearbox as claimed in claim 6 in which the fixed gear is an internal gear.

* * * * *